Nov. 3, 1925.　　　　　　H. W. CONDE ET AL　　　　1,560,410
REFLECTOR SIGNAL
Filed Dec. 18, 1924
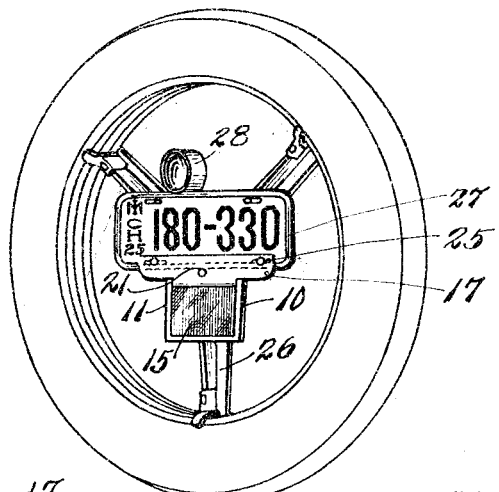
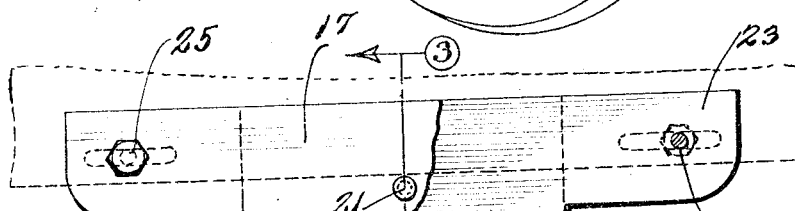
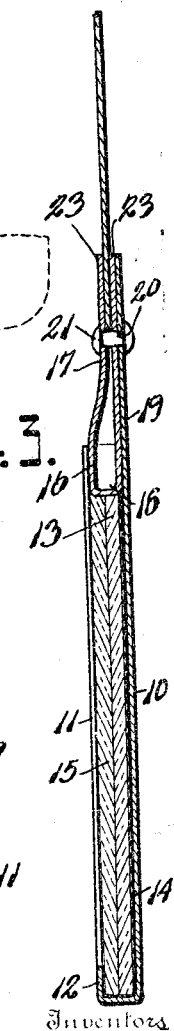
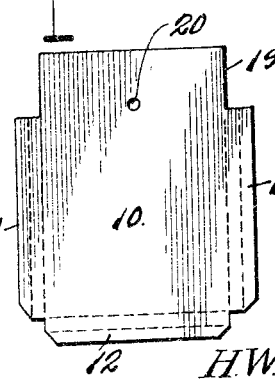
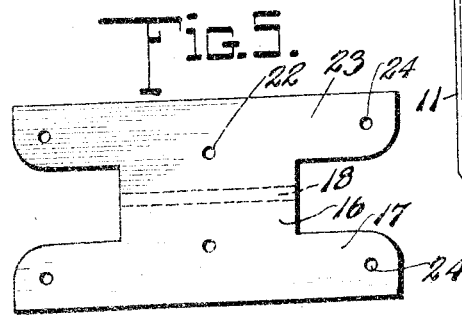
Witness:
E. H. Wagner
Inventors
H. W. Conde
Dana M. Palmer
By Robb, Robb & Hill
Attorney Patented Nov. 3, 1925.

1,560,410

UNITED STATES PATENT OFFICE.

HARRY WARD CONDE AND DANA M. PALMER, OF OTTAWA, ILLINOIS.

REFLECTOR SIGNAL.

Application filed December 18, 1924. Serial No. 756,786.

*To all whom it may concern:*

Be it known that we, HARRY WARD CONDE and DANA M. PALMER, citizens of the United States, residing at Ottawa, in the county of La Salle and State of Illinois, have invented certain new and useful Improvements in Reflector Signals, of which the following is a specification.

This invention relates to a reflector signal, and particularly to a construction embodying an unlighted reflecting surface adapted to be attached to a vehicle by means of a supporting frame.

Many accidents occur upon the highways by the operation of vehicles without proper warning lights, and this is often due to oversight by the driver or the disabling of a lamp without his knowledge. In such event the use of this signal device causes the light from an approaching machine to be automatically reflected without glare, so that a warning is immediately given of the presence of the unlighted machine. This is of especial importance when an automobile is stalled or disabled, so that its lights are inoperative; particularly if the tail light becomes disabled its function will be fully performed by the reflector if disposed in a position adjacent thereto.

In the production of such a reflector it is important to provide for the protection of the reflecting surface which is ordinarily supported in an exposed position and liable to be damaged under conditions of use. The breaking of the reflecting surface or lens incurs considerable expense for replacement and it is therefore desirable to protect this surface by an outer covering plate of much cheaper character which can be readily replaced whenever necessary or desirable either for changing the color to be reflected from a mirror or for preventing contact with the surface thereof, either by obstacles upon the road or the atmospheric conditions which would affect the same. Such a signal is preferably of an unobtrusive character adapted to be readily attached to the desired part of the vehicle and should embody both simplicity and economy in construction so that it may be ordinarily carried upon the machine in addition to the usual signal lights in order to supplement or protect against failure of the same.

The invention has for an object to provide a novel and improved construction of reflecting signal comprising a frame in which a reflecting plate is supported in intimate contact with a protecting face plate, these members being enclosed by a holder adapted to be supported from the vehicle.

A further object of the invention is to provide an improved construction of the supporting frame for the reflecting members comprising flanged edges and an extended upper portion which cooperates with a holder entering between the flanges and contacting with the upper surfaces of the reflecting plates in order to retain them against movement within the frame members under the vibratory conditions of road service.

Another object of the invention is to provide a frame for the reflecting plates adapted to be formed from a single blank bent to produce supporting edges for the plates and to cooperate with a supporting blank adapted for attachmnct to the frame.

Other and further objects and advantages of the invention will be hereinafter set forth and the novel features thereof defined by the appended claims.

In the drawing:

Figure 1 is a perspective showing one application of the invention;

Figure 2 is an enlarged elevation thereof with parts in section;

Figure 3 is a section on the line 3—3 of Figure 2;

Figure 4 is a detail of the frame blank; and

Figure 5 is a similar view of the supporter blank.

Like reference numerals refer to like parts throughout the several figures of the drawing.

The signal device may be of any desired configuration or ornamentation and the size and material thereof likewise altered as found most convenient or desirable. In the form of the invention herein disclosed the frame is formed from a blank of sheet metal 10 having at opposite sides flange portions 11 which are angularly bent to provide the retaining flanges for the reflecting members, and one end of this blank is similarly formed with a flange to provide the supporting flange 12 for said members. The reflecting members comprise a reflector plate 13 which may be of any desired character and is here shown as formed of glass with a silvered back 14 to constitute the usual type of mirror. This plate rests upon the base flange 12 and fits closely about the side flanges 11 so as to be held against movement therein.

In order to protect this mirror or reflector 13 an outer plate 15 is similarly disposed within the flanges. This plate may be of clear glass or other material of any desired character and effectually prevents injury to the more expensive mirror member while likewise permitting a change in the color of the reflection by replacing a glass of one color by that of another. For instance, if the mirror is desired for use at the rear a ruby red glass would be used to cover the same, while in the use of a side light a green glass would be used. These plates are disposed in direct close contact with each other for their entire area so as to effectually prevent the entrance of moisture or dirt between them and this is further facilitated by the holding flange 16 carried by the supporting plate 17 and adapted to enter the flanges 11 of the holder and rest in direct contact with the upper surfaces of the plates. For this purpose the holding flange 16 is provided with a flat surface 18 which by its pressure upon the plates prevents any movement thereof in the vibration of the machine.

The supporting plate is adapted to be attached to the frame by means of the extended upper portion 19 thereof which is provided with an aperture 20 to receive a rivet or other fastening means 21 extending through the apertures 22 of the supporting plate 17. This forms a means for attachment by a single device while the insertion of the holding flange within the side flanges of the frame prevents any oscillatory movement of the parts upon each other.

This supporting plate is preferably formed from a single blank of H-shaped configuration as shown in Figure 5, which is folded upon itself to provide the flat face 18 resting upon the reflecting plates while the edges 23 thereof are free and adapted to embrace the surface from which the reflector is to be supported. For this purpose they are further provided with apertures 24 adapted to receive attaching devices 25 as shown in Figure 2.

While the reflector is adapted for application to any desired part of the vehicle and also in other stationary positions, still it is here shown as applied to the tire carrier 26 supported in the usual manner upon a vehicle and is bolted to the license tag 27 through the usual slots therein so that light thrown upon the reflector will also illuminate the tag, rendering the numbers visible. In this association it also serves as a safeguard against the failure of the tail light 28 which is mounted to cooperate with said tag in the usual manner.

The invention is adapted for the production of a vehicle reflector signal in which the reflecting plates have a solid supporting body at their rear and are retained at the side and bottom edges by the flanges of the frame while the supporting plate carries a holding portion entering this frame to bear upon the plates, not only retaining them in position but preventing the entrance of dust or dirt between the glass surfaces. An efficient reflection is thus possible at all times of any light which may come into alignment with the reflector and a convenient means provided for supporting the same in rigid position upon a portion of the vehicle.

The use of a protecting plate in direct contact with the outer face of the mirror forms not only a protecting medium but also a convenient means by which the color or characteristics of the signal may be changed at will by a replacement of this outer plate, while the device as a whole being adapted for production by a stamping method is capable of economical manufacture and embodies the necessary strength and stability to provide for efficient operation.

While the details of construction have been specifically shown and described as well as the manner of mounting the signal, still changes and alterations may be made therein without departing from the spirit of the invention as defined by the appended claims.

Having thus described our invention, what we claim as new and desire to secure by Letters Patent is:

1. A signal comprising a frame having an open side, a reflecting plate supported within the frame, a protecting face plate in direct contact with the reflection plate, and means disposed at said open side to engage and retain both plates in position.

2. A signal comprising a frame having an open side, a reflecting plate supported within the frame, a protecting face plate in direct contact with the reflecting plate, and a holder carried by the frame at its open side adapted to retain said plates within the frame and provide means for its support.

3. A signal comprising a frame having an open side, a reflecting plate supported thereby, and a supporting plate secured to the frame and having holding means adapted to enter the open side of said frame and bear upon the reflecting plate.

4. A signal comprising a flanged frame open at the top and having a laterally extended upper portion, a reflecting plate retained by the flanges of the frame, and a supporter secured to said extended portion and adapted to enter the frame between the flanges to cover and protect the top of said plate.

5. A signal comprising a flanged frame having an extended upper portion, a reflecting plate retained by the flanges of the frame, a supporter secured to said extended portion and adapted to enter the frame between the flanges to cover and protect the top of said plate, and means for connecting said frame and supporter disposed at a point removed from the free edge of the latter.

6. A signal comprising a frame having flanges about its base and side edges and an extended rear wall at the upper portion thereof, a reflecting plate disposed within said frame in contact with the rear wall thereof, and a protecting plate in direct contact with the reflecting plate, and disposed within said frame.

7. A signal comprising a frame having flanges about its base and side edges and an extended rear wall at the upper portion thereof, a reflecting plate disposed within said frame in contact with the rear wall thereof, a protecting plate in direct contact with the reflecting plate and disposed within said frame, and a supporting plate having parallel free edges and an intermediate portion provided with a flat face to enter the side flanges of the frame and contact with the top edges of the plates therein.

8. A signal comprising a frame having flanges about its base and side edges and an extended rear wall at the upper portion thereof, a reflecting plate disposed within said frame in contact with the rear wall thereof, a protecting plate in direct contact with the reflecting plate and disposed within said frame, a supporting plate having parallel free edges and an intermediate portion provided with a flat face to enter the side flanges of the frame and contact with the top edges of the plates therein, and means provided upon said supporting plate for the attachment thereof.

In testimony whereof we affix our signatures.

HARRY WARD CONDE.
DANA M. PALMER.